(12) United States Patent
Loheide et al.

(10) Patent No.: US 10,075,753 B2
(45) Date of Patent: Sep. 11, 2018

(54) DYNAMIC SCHEDULING AND CHANNEL CREATION BASED ON USER SELECTION

(71) Applicant: Turner Broadcasting System, Inc., Atlanta, GA (US)

(72) Inventors: Donald Jude Loheide, Mableton, GA (US); Carlos Jorge M Monteiro, Smyrna, GA (US); Nicolas Paul Webb, Mcdonough, GA (US); Nishith Kumar Sinha, Mableton, GA (US); James J Arnzen, Atlanta, GA (US); Mark Cooper Pope, V, Atlanta, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 15/396,462

(22) Filed: Dec. 31, 2016

(65) Prior Publication Data

US 2018/0192110 A1 Jul. 5, 2018

(51) Int. Cl.

| H04N 7/10 | (2006.01) |
|---|---|
| H04N 21/262 | (2011.01) |
| H04N 21/2187 | (2011.01) |
| H04N 21/25 | (2011.01) |
| H04N 21/234 | (2011.01) |
| H04N 21/258 | (2011.01) |

(52) U.S. Cl.
CPC ... *H04N 21/26283* (2013.01); *H04N 21/2187* (2013.01); *H04N 21/23424* (2013.01); *H04N 21/252* (2013.01); *H04N 21/25825* (2013.01)

(58) Field of Classification Search
CPC ....... H04N 21/26283; H04N 21/25825; H04N 21/23424; H04N 21/2187; H04N 21/252
USPC .......................................................... 725/35
See application file for complete search history.

(56) References Cited

U.S. PATENT DOCUMENTS

| 6,378,129 B1 * | 4/2002 | Zetts ................. H04L 29/06027 348/E5.008 |
|---|---|---|
| 6,625,811 B1 * | 9/2003 | Kaneko .................. H04H 20/12 348/E7.063 |
| 6,701,355 B1 | 3/2004 | Brandt et al. |
| 6,727,914 B1 | 4/2004 | Gutta |

(Continued)

OTHER PUBLICATIONS

Office Action in U.S. Appl. No. 15/396,468 dated Jan. 26, 2018.
(Continued)

*Primary Examiner* — Michael B Pierorazio
(74) *Attorney, Agent, or Firm* — Chip Law Group

(57) ABSTRACT

A content packaging and distribution system that handles distribution of channels to be viewed on a plurality of consumer devices, receives a media feed and a first programming schedule of a first channel from a source device. An input that corresponds to a user-selection is received on a first consumer device of the plurality of consumer devices over a distribution system, and a media item to be inserted in the media feed of the first channel is determined based on criteria related to the user-selection. The determined media item may be dynamically scheduled in the media feed of the first channel to be delivered over the distribution system to be viewed on the first consumer device, based on the user-selection related criteria. The user-selection includes a first criterion that corresponds to a real time or a near-real time user input corresponding to the user-selection on the first consumer device.

18 Claims, 8 Drawing Sheets

(56) References Cited

U.S. PATENT DOCUMENTS

| | | | |
|---|---|---|---|
| 7,051,352 B1 | 5/2006 | Schaffer | |
| 7,337,458 B2 | 2/2008 | Michelitsch et al. | |
| 7,380,262 B2 | 5/2008 | Wang et al. | |
| 7,581,237 B1 | 8/2009 | Kurapati | |
| 7,840,980 B2 | 11/2010 | Gutta | |
| 7,985,134 B2 | 7/2011 | Ellis | |
| 8,005,826 B1* | 8/2011 | Sahami | G06F 17/30023 707/723 |
| 8,533,761 B1* | 9/2013 | Sahami | H04N 5/44543 725/51 |
| 8,572,649 B1* | 10/2013 | Gossweiler, III | H04N 21/4532 725/39 |
| 8,578,042 B2* | 11/2013 | Hu | H04N 7/165 709/203 |
| 8,631,440 B2* | 1/2014 | Gossweiler, III | G06F 17/30817 725/52 |
| 8,826,443 B1* | 9/2014 | Raman | G06F 11/004 726/26 |
| 8,843,965 B1 | 9/2014 | Kurapati et al. | |
| 9,094,639 B2 | 7/2015 | Yim et al. | |
| 9,130,918 B2* | 9/2015 | Picconi | H04L 67/104 |
| 2002/0038457 A1* | 3/2002 | Numata | H04N 5/44543 725/47 |
| 2003/0023757 A1 | 1/2003 | Ishioka et al. | |
| 2003/0051239 A1 | 3/2003 | Hudspeth | |
| 2003/0212708 A1* | 11/2003 | Potrebic | G06F 17/30265 |
| 2004/0022278 A1 | 2/2004 | Thomas et al. | |
| 2004/0128682 A1 | 7/2004 | Liga et al. | |
| 2005/0120369 A1 | 6/2005 | Matz | |
| 2006/0031889 A1* | 2/2006 | Bennett | H04L 29/06027 725/80 |
| 2007/0238035 A1 | 10/2007 | Holscher et al. | |
| 2008/0086742 A1 | 4/2008 | Aldrey et al. | |
| 2008/0271078 A1* | 10/2008 | Gossweiler | H04N 5/44543 725/40 |
| 2008/0271080 A1* | 10/2008 | Gossweiler | G06F 3/0486 725/47 |
| 2008/0320513 A1 | 12/2008 | Wong et al. | |
| 2009/0070819 A1* | 3/2009 | Gajda | H04H 60/65 725/46 |
| 2009/0254934 A1 | 10/2009 | Grammens | |
| 2010/0146559 A1 | 6/2010 | Lee et al. | |
| 2010/0325657 A1* | 12/2010 | Sellers | H04N 21/23424 725/32 |
| 2011/0238754 A1 | 9/2011 | Dasilva et al. | |
| 2012/0110621 A1* | 5/2012 | Gossweiler, III | G06Q 50/01 725/46 |
| 2012/0192232 A1* | 7/2012 | Ellis | H04N 5/44543 725/41 |
| 2012/0272264 A1* | 10/2012 | Suzuki | H04N 21/23113 725/33 |
| 2012/0284737 A1 | 11/2012 | Savoor et al. | |
| 2013/0198328 A1 | 8/2013 | Green et al. | |
| 2013/0208811 A1 | 8/2013 | Liu et al. | |
| 2013/0305287 A1* | 11/2013 | Wong | H04N 21/482 725/42 |
| 2014/0143806 A1 | 5/2014 | Steinberg et al. | |
| 2014/0157312 A1* | 6/2014 | Williams | H04N 21/4126 725/39 |
| 2014/0189743 A1* | 7/2014 | Kennedy | H04N 21/44222 725/46 |
| 2014/0351843 A1* | 11/2014 | Theriault | H04N 21/2668 725/25 |
| 2014/0366068 A1* | 12/2014 | Burkitt | G06F 17/30817 725/61 |
| 2015/0012926 A1 | 1/2015 | Wei et al. | |
| 2015/0237386 A1 | 8/2015 | Sheehan et al. | |
| 2015/0237389 A1* | 8/2015 | Grouf | H04N 21/26283 725/49 |
| 2015/0382274 A1 | 12/2015 | Logvinov et al. | |
| 2017/0070789 A1 | 3/2017 | Liassides et al. | |
| 2017/0201779 A1 | 7/2017 | Publicover et al. | |
| 2017/0238035 A1 | 8/2017 | Perez | |

OTHER PUBLICATIONS

Office Action in U.S. Appl. No. 15/396,453 dated Feb. 27, 2018.
Advisory Action in U.S. Appl. No. 15/396,453 dated Apr 20, 2018.
Office Action in U.S. Appl. No. 15/396,475 dated Mar 29, 2018.
Non-Final Office Action in U.S. Appl. No. 15/396,453 dated Jun. 14, 2018.
Non-Final Office Action in U.S. Appl. No. 15/396,468 dated Jul 3, 2018.
Advisory Action in U.S. Appl. No. 15/396,614 dated Mar 16, 2018.
Final Office Action in U.S. Appl. No. 15/396,475 dated Jul 12, 2018.
Non-Final Office Action in U.S. Appl. No. 15/396,614 dated May 18, 2018.
Non-Final Office Action in U.S. Appl. No. 15/396,624 dated Jul 13, 2018.

* cited by examiner

US 10,075,753 B2

DYNAMIC SCHEDULING AND CHANNEL CREATION BASED ON USER SELECTION

CROSS-REFERENCE TO RELATED APPLICATIONS/INCORPORATION BY REFERENCE

This application makes reference to:
U.S. application Ser. No. 15/396,453, which was filed on Dec. 31, 2016;
U.S. application Ser. No. 15/396,468, which was filed on Dec. 31, 2016; and
U.S. application Ser. No. 15/396,475, which was filed on Dec. 31, 2016.

Each of the above referenced patent applications is hereby incorporated herein by reference in its entirety.

FIELD OF TECHNOLOGY

Certain embodiments of the disclosure relate to television content packaging and distribution system. More specifically, certain embodiments of the disclosure relate to a method and system for dynamic scheduling and channel creation based on user selection.

BACKGROUND

Advancements in the television and broadcasting sector have led to the development of various technologies and broadcasting platforms that are changing the way consumers access and view media content. Broadcasting platforms usually refers to the types of networks that are used to deliver the television signal to the viewer. Currently, all the broadcasting platforms, such as analogue terrestrial broadcast, digital terrestrial broadcast, direct-to-home satellite broadcast, cable, Internet Protocol (IP), and over-the-top television (OTT), compete and strive to increase their appeal in order to gain wider audience. The television viewing market is no longer exclusively concerned with whether media content services are viewed on a dedicated television or another device capable of playing media content. As a result of penetration of new technologies in the television, radio, and broadcasting sector, it is evident that the success of broadcasting will be dependent on the ability of the network provider to gain access to the content that consumers demand, and to differentiate their offering from that of incumbent broadcasters or find new modes of content delivery.

Traditionally, a network provider (network operator) usually decides what content to distribute in the upcoming broadcast year and when to air them. A programming schedule defines what to broadcast and when, ensuring an adequate or maximum utilization of airtime. Accordingly, the media content is packaged into brands, or organized into channels to be delivered to consumers. Increased competition has led the broadcast providers (or the network providers) to differentiate their offering and handle multiple channels at the same time, which in turn have added unparalleled levels of complexity. This required installation of large infrastructures and resources to maintain uninterrupted content delivery for existing channels and also meet the ever-increasing demand of new channels. Thus, an advanced system may be required that provides the network provider with an ability to not only provide new channel offerings in cost-effective manner but also provide enhanced viewer experience to increase their appeal in order to gain wider audience.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for dynamic scheduling and channel creation based on user selection, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
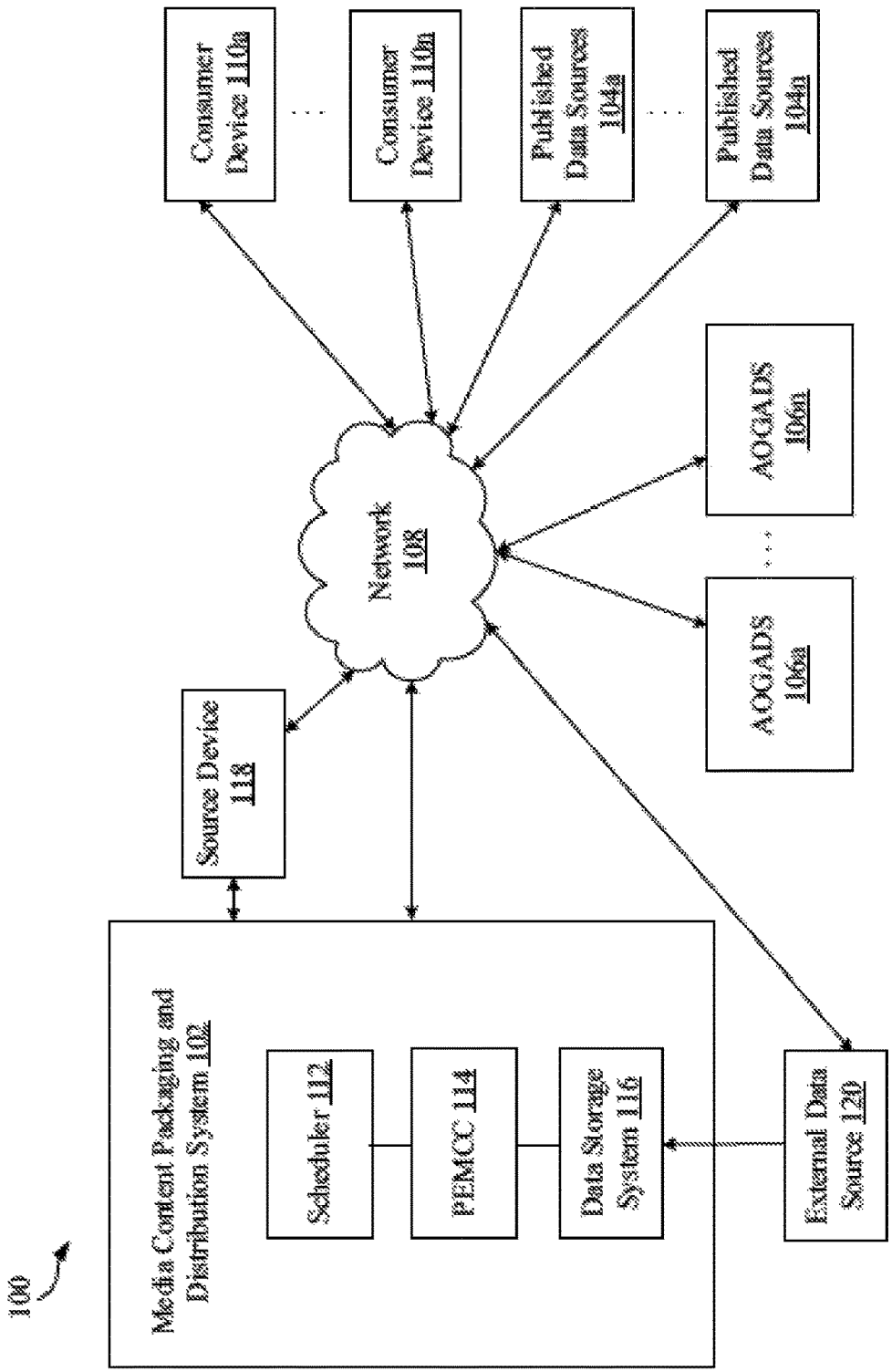
FIG. 1A is a block diagram that illustrates an exemplary system for dynamic scheduling and channel creation, in accordance with an exemplary embodiment of the disclosure.

Certain embodiments of the disclosure may be found in a method and system for dynamic scheduling and channel creation based on user selection. Various embodiments of the disclosure provide a method and system that simplifies scheduling and channel creation process, and provides the network provider with an ability to not only provide new channel offerings in cost-effective manner but also provide enhanced user experience to increase their appeal in order to gain wider audience.

In accordance with various embodiments of the disclosure, a media content packaging and distribution system is provided that handles distribution of one or more channels to be viewed on one or more of a plurality of consumer devices. The media content packaging and distribution system receives a media feed and a first programming schedule of a first channel of the one or more channels from a source device. An input that corresponds to a user-selection on a first consumer device of the plurality of consumer devices is received over a network. A media item to be inserted in the media feed of the first channel is determined based on criteria related to the user-selection. The determined media item is dynamically scheduled in the media feed of the first channel to be delivered over a distribution system to be viewed on the first consumer device, based on the criteria related to the user-selection.

In accordance with an embodiment, the criteria related to the user-selection may comprise a first criterion that corresponds to a real time or a near-real time user input corresponding to the user-selection on the first consumer device. A set of media items to be presented on the first consumer device to receive the real time or a near-real time user input that corresponds to a selection of at least one media item from the presented set of media items may be determined. The media feed of the first channel may be modified to include the selected media item to be delivered over the distribution system to be viewed on the first consumer device. The criteria related to the user-selection may further comprise a second criterion that corresponds to a filtering operation based on user-defined metadata. The criteria related to the user-selection may further comprise a third criterion that corresponds to historical analysis of viewing habits of a user associated with the first consumer device. The first programming schedule may be modified to generate a second programming schedule based on the received input that corresponds to the user-selection on the first consumer device of the plurality of consumer devices.

In accordance with an embodiment, a second channel may be created from the first channel based on the received input that corresponds to the user-selection on the first consumer device of the plurality of consumer devices, at least the determined media item to be inserted in the media feed, and the generated second programming schedule. A plurality of new device-specific channels may be created from the first channel for a set of consumer devices associated with a common subscriber account. This may be done based on different input that corresponds to different user-selection on the set of consumer devices, of the plurality of consumer devices, associated with the common subscriber account, different media items determined for the set of consumer devices, and the different programming schedules generated based on the modification of the first programming schedule of the first channel. A plurality of new channels may be created from the first channel based on: a plurality of user-selections received from the plurality of consumer devices over the distribution system, a plurality of media items determined for the plurality of consumer devices, and a plurality of programming schedules generated for the plurality of consumer devices based on the modification of the first programming schedule of the first channel.

FIG. 1A is a block diagram that illustrates an exemplary system for dynamic scheduling and channel creation, in accordance with an exemplary embodiment of the disclosure. Referring to FIG. 1A, the system 100, comprises a media packaging and distribution system 102 that is communicatively coupled to published data sources 104a, . . . , 104n, advertiser order generation and advertisement decisioning systems (AOGADS) 106a, . . . , 106n, via a network 108 and/or other programmatic means. There is shown consumer devices 110a, . . . , 110n that are communicatively coupled to the network 108. The media content packaging and distribution system 102 may comprise a scheduler 112, a system for converting pre-encoded media content for live distribution, hereinafter referred to pre-encoded media content converter (PEMCC) 114, and a data storage system 116. There is also shown a source device 118 communicatively coupled to the scheduler 112 and the network 108. An external data source 120 is also provided, which is communicatively coupled to the data storage system 116, and the network 108.

The media content packaging and distribution system 102 may comprise suitable logic, circuitry, and interfaces that may be configured to execute code that handles distribution of content comprising audio, video, images, metadata, and/or other data (embedded and/or externally referenced). The media content packaging and distribution system 102 handles distribution, for example, multicasting, unicasting, broadcasting, streaming, for one or more channels to be viewed on one or more of the plurality of consumer devices 110a, . . . , 110n. The media content packaging and distribution system 102 may be operated by an entity related to handling or distribution of media content, for example, a broadcast provider or operator, or a network provider or operator. The entity related to handling or distribution of media content may also refer to a content owner, a distributor, a syndicator, a re-distributor, a content aggregator, a search, discovery, or cataloging service provider, or any other entity actively or passively involved with the distribution, cataloging, or referencing of complete or partial presentations of media content. The media content may include a video, an audio, a combination of audio and video presentations, a combination of audio, video, and/or embedded or externally referenced metadata, a combination of multiple-audio, multiple-video, and/or embedded or externally referenced metadata. The media content may also include metadata associated with the audio/video presentation, such as game scores, statistics, or timings, social media, cast/character/credits, geo-spatial data, and/or still-images or graphics (referenced or embedded). Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs).

Each of the plurality of published data sources 104a, . . . , 104n may be coupled to one or more television networks and may comprise suitable logic, circuitry, and interfaces that may be configured to execute code that provides actual audiences for programs that were distributed. As illustrated in FIG. 1A, the plurality of published data sources 104a, . . . , 104n are coupled to the media content packaging and distribution system 102 via the network 108. The plurality of published data sources 104a, . . . , 104n may provide actual audiences for programs to the data storage system 116. An exemplary published data source may be Nielsen. Another exemplary published data source may be a published database that provides ratings for a media item, such as gross rating point (GRP). The GRP is an advertising or a promotion impact measure for each advertising and/or promotional campaigns, known in the art. Other exemplary published data sources may also include direct/indirect access to other public or private data sources (persistent or ephemeral) through programmatic means.

The AOGADS 106a, ..., 106n may comprise suitable logic, circuitry, and interfaces that may be configured to place orders with the network provider that include information about type of spots to be distributed (e.g. multicasting, unicasting, broadcasting, streaming), the number of spots to be distributed, and when should the spots be distributed. The media content packaging and distribution system 102 may be configured to electronically receive, via the network 108, deals comprising advertisers' orders from the plurality of AOGADS 106a, ..., 106n. The AOGADS 106a, ..., 106n may provide multiple orders, which need not be submitted at the same time. Therefore, orders with new or additional spots to be placed and any previously determined commercial break schedule may needs to be updated to accommodate the constraints and requirements of those spots already placed and of the new spots being received. In this regard, the AOGADS 106a, ..., 106n may electronically book spots to a selling title (ST), and within the selling title there are constraints. The advertiser's order comprises airing constraints and placement requirements corresponding to the one or more spots, and each of the one or more commercial breaks comprises a plurality of inventory buckets. The airing constraints corresponding to each of the one or more spots comprise, for example, one or more of network constraints, selling title constraints, inventory utilization type constraints, allowable date and time constraints, and advertiser conflict constraints. In accordance with an embodiment, when the advertisements are inserted into a source stream, the advertisements are usually run (or pass) through the order generation component of the AOGADS 106a, ..., 106n. The advertisement decisioning component of the AOGADS 106a, ..., 106n is used during a real-time content or advertisement placement activity, for example during dynamic ad insertion. For example, commercial or non-commercial advertisements may be dynamically inserted within program segments of a media feed based on the detected upcoming inbound trigger, signaling point, and/or signal in a source stream by the AOGADS 106a, ..., 106n. The AOGADS 106a, ..., 106n may utilize the programming schedule to identity the opportunities for the real-time content or advertisement placement activity. In accordance with an embodiment, the advertisement decisioning component of the AOGADS 106a, ..., 106n may be implemented in a client device, such as one or more of the plurality of consumer devices 110a, ..., 110n. In such a case, the advertisement decisioning component of the AOGADS 106a, ..., 106n may identify real-time content or advertisement placement opportunity for dynamic ad insertion. For example, commercial or non-commercial advertisements may be dynamically inserted within program segments of a media feed based on the detected upcoming inbound trigger, signaling point, and/or signal in a source stream by the AOGADS 106a, ..., 106n when implemented in the client device.

The network 108 may be any kind of network, or a combination of various networks, and it is shown illustrating the communication that may occur between the AOGADS 106a, ..., 106n and the media content packaging and distribution system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard, Accordingly, other exemplary modes may comprise uni-directional or bi-directional distribution, such as packet-radio, satellite. Furthermore, the network 108 is an exemplary embodiment of a distribution system.

The consumer devices 110a, ..., 110n may refer to end-user devices or consumption devices where the content is played to be consumed by a user. The number of impressions of a media item, such as an advertisement and/or promotional media, on such plurality of consumer devices 110a, ..., 110n determines the advertising impact or promotion impact and number of actual audiences achieved during campaigns. Examples of the consumer devices 110a, ..., 110n may include, but are not limited to connected TVs, connected TV with paired and/or connected devices (e.g., HDMI sticks, tablets), and second screen devices such as smartphones, tablets, game consoles, personal computers, set-top boxes, embedded devices, or any process/system capable of processing the output for any means, regardless of the capability or intent to decode for media presentation.

The scheduler 112 may comprise suitable logic, circuitry, and interfaces that may be configured to execute a code that handles a programming schedule of a channel. The programming schedule of a channel defines what media content should be scheduled, the ordering of the media content during playout, and when to distribute the content. The media content that is distributed may include both the programming content, such as long-form presentations, short-form presentations, news or sporting events; and non-programming content, such as paid advertisements, public service advertisements, or promotional material. In accordance with an embodiment, the programming schedule may data structures or file formats capable of being processed by a computer, that comprise a reference mapping of different media content items that needs to be stitched by the PEMCC 114. The scheduler 112 may receive a programming schedule of an existing channel from the source device 118. The scheduler 112 may modify the received programming schedule to generate a new programming schedule, where the generation of the new programming schedule may be driven by real time or near-real time content context analysis, user-selection on a consumer device, such as the consumer devices 110a, ..., 110n, or driven by external data received from the external data source 120.

The PEMCC 114 may comprise suitable logic, circuitry, and interfaces that may be configured to execute a code to stitch one or more media items in accordance with the specified play schedule, such as the generated new programming schedule, to generate a specific program stream to be delivered to one or more of the plurality of consumer devices 110a, ..., 110n, based on the defined parameters. In accordance with an embodiment, the PEMCC 114 may be configured to stitch one or more pre-encoded media assets stored in the data storage system 116 with newly encoded live media sources to create a program stream for a new channel that is in a suitable state (or ready) to be distributed to one or more of the plurality of consumer devices 110a, ..., 110n without a requirement to re-encode the pre-encoded media assets before the distribution of the program stream of the new channel. In this regard, a stream could be tailored for a single device of the consumer devices 110a, ..., 110n, or for a plurality of the consumer devices 110a, ..., 110n. The decisioning as to which pre-encoded media assets to select for delivery over the network 108 to the one or more of the plurality of consumer devices 110a, ..., 110n may be based on the manipulation of the programming schedules that may be done in real time or near-real time. The manipulation of the programming schedules is driven by real time or near-real time content context analysis, user-selection on the consumer devices 110a, ..., 110n, or driven by external data received from the external data source 120. The PEMCC 114 may also be referred to as a stream manipulator that may be configured to insert live content or pre-stored media content, in an existing program stream based on manipulation of a programming schedule of an existing program stream, such as an existing channel. The insertion of live content, pre-stored media content, pre-encoded media assets, and/or the like may be driven by real time or near-real time content context analysis, user-selection on the consumer devices 110a, ..., 110n, or driven by external data received from the external data source 120. Alternatively, both the live or pre-stored programming content (such as long-form presentations, short-form presentations, news or sporting events); and non-programming content, such as paid advertisements, public service advertisements, or promotional material, may be dynamically scheduled, inserted, and stitched to create new channels based on real time or near-real time (or with a certain lag time) manipulation of the programming schedule.

The data storage system 116 may comprise suitable logic, circuitry, and interfaces that may be configured to store pre-encoded media content segments, such as VOD assets, live content segments, and metadata related to the pre-encoded media content segments and the live content segments. The data storage system 116 may also store, process, and generate aggregate viewing information based on various data feeds received from the external data source 120 and the published data sources 104a, ..., 104n.

The source device 118 may comprise suitable logic, circuitry, and interfaces that may be configured to communicate a media feed and a programming schedule of a channel, such as an existing channel, to the media content packaging and distribution system 102. In accordance with an embodiment, the media feed of the channel may correspond to, for example, a broadcast feed. In one exemplary embodiment, the media feed may comprise video feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110a, ..., 110n. The audience data may include demographics data, audience targeting data, trending data, device type data, device platform data, and content recognition-based data, such as automatic content recognition (ACR)-based data. The trending data comprises information of what's trending in the social networks (or platforms), such as Twitter, Facebook, and the like. The trending data also comprises information of what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

In operation, the media content packaging and distribution system 102 may be configured to handle distribution of one or more channels to be viewed on one or more of the plurality of consumer devices, such as the consumer devices 110a, ..., 110n. The scheduler 112 may be configured to receive a media feed and a first programming schedule of a first channel of the one or more channels from the source device 118. An application server (described in FIG. 1B) may be configured to receive a user-preference from a first consumer device of the plurality of consumer devices 110a, ..., 110n on which the first channel is viewed. The scheduler 112 may be configured to analyze, based on content context analysis, one or more other live feeds of other channels of the one or more channels or pre-encoded media assets stored in the data storage system 116. The scheduler 112 may be further configured to recommend, based on the content context analysis, a media item to be inserted in the media feed of the first channel, based on the received user-preference. The scheduler 112 may be configured to dynamically schedule the recommended media item in the media feed of the first channel to be delivered over a distribution system, for example, the network 108, to be viewed on the first consumer device of the plurality of consumer devices 110a, ..., 110n. The scheduler 112 may be configured to dynamically schedule the recommended media item based on the content context analysis executed in real time or near-real time. The scheduler 112 may modify the first programming schedule to generate a second programming schedule to deliver the recommended media item over the network 108. The PEMCC 114 may be configured to stitch one or more media items that corresponds to the recommended media item in one or more spots of the received media feed to generate a program stream for distribution to the first consumer device or other consumer devices of the plurality of consumer devices 110a, ..., 110n.

In accordance with an exemplary aspect of the disclosure, the television content packaging and distribution system 102 may be configured to handle distribution of one or more channels to be viewed on one or more of a plurality of consumer devices, such as the consumer devices 110a, ..., 110n. The scheduler 112 may be configured to receive a media feed and a first programming schedule of a first channel of the one or more channels from the source device 118. The scheduler 112 may be configured to recommend a set of media items to present to the user based on, for example, demographic data, trending data, previous viewing history or past user-selections, associated with a consumer device from which a user selection can be made. The scheduler 112 may be configured to receive an input that corresponds to a user-selection on a first consumer device of the plurality of consumer devices (such as the consumer devices 110a, ..., 110n) via a distribution system such as the network 108. The scheduler 112 may be configured to determine a media item to be inserted in the media feed of the first channel based on criteria related to the user-selection. The criteria related to the user-selection may comprise a first criterion that corresponds to a real time or a near-real time user input corresponding to the user-selection on the first consumer device. The criteria related to the user-selection may further comprise a second criterion that corresponds to a filtering operation based on user-defined metadata. The criteria related to the user-selection may further comprise a third criterion that corresponds to historical analysis of viewing habits of a user associated with the first consumer device. The scheduler 112 may be further configured to dynamically schedule the determined media item in the media feed of the first channel to be delivered over the distribution system such as the network 108 to be viewed on the first consumer device, based on the criteria related to the user-selection. The scheduler 112 may be further configured to modify the first programming schedule to generate a second programming schedule based on the received input that corresponds to the user-selection on the first consumer device of the plurality of consumer devices.

Figure 1B:
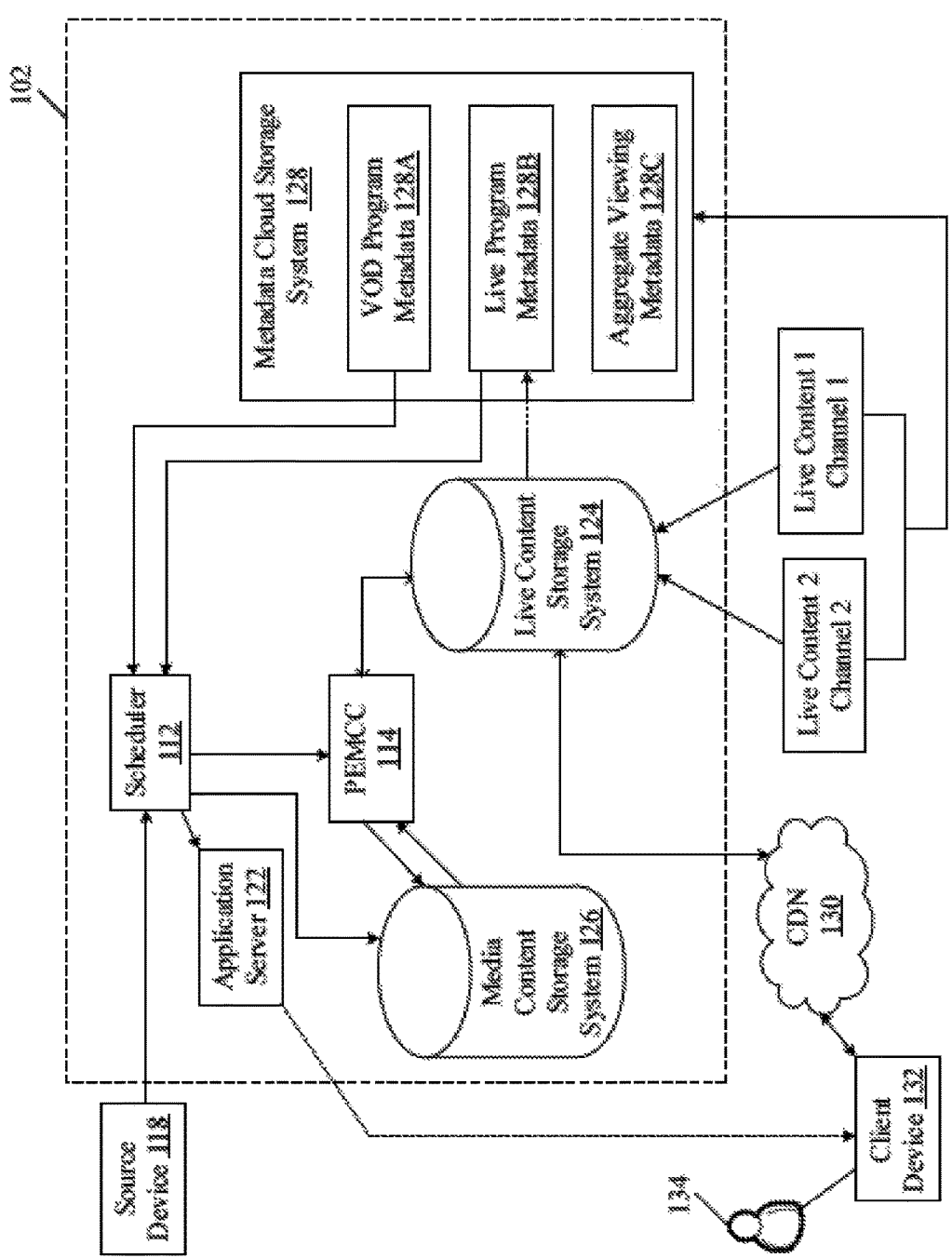
FIG. 1B is a block diagram that illustrates an exemplary media content packaging and distribution system for dynamic scheduling and channel creation, in accordance with an exemplary embodiment of the disclosure.

FIG. 1B is a block diagram that illustrates an exemplary media content packaging and distribution system for dynamic scheduling and channel creation, in accordance with an exemplary embodiment of the disclosure. Referring to FIG. 1B, the media content packaging and distribution system 102 may further comprise an application server 122, a live content storage system 124, a media content storage system 126, and a metadata cloud storage system 128. The metadata cloud storage system 128 may include VOD program metadata 128A, live program metadata 128B, and aggregate viewing information 128C. The live content storage system 124, the media content storage system 126, and the metadata cloud storage system 128 may be provided in the data storage system 116, as described in FIG. 1A. There is shown the scheduler 112, the PEMCC 114, and the source device 118 provided in the media content packaging and distribution system 102, as described in FIG. 1A. There is also shown a CDN 130, which is an example of the network 108, a client device 132, which is one of the plurality of consumer devices 110a, . . . , 110n, and a user 134 associated with the client device 132.

In some embodiments of the disclosure, the scheduler 112, the PEMCC 114, and the application server 122 may be integrated to form an integrated system. In some embodiments of the disclosure, as shown, the scheduler 112, the PEMCC 114, and the application server 122 may be distinct. Other separation and/or combination of the various entities of the exemplary media content packaging and distribution system 102 illustrated in FIG. 1B may be done without departing from the spirit and scope of the various embodiments of the disclosure.

The application server 122 may comprise suitable logic, circuitry, and interfaces that may be configured to communicate a notification of a recommended media item to a consumer device, for example, the client device 132. The notification may be communicated to seek a confirmation from a user, such as the user 134 associated with the client device 132 to display the recommended media item on the client device 132. The application server 122 may further receive an input that corresponds to the confirmation from the user 134 associated with the client device 132 to display the recommended media item on the client device 132, and further communicate the received input to the scheduler 112. The application server 122 may be further configured to receive user-preferences from the plurality of consumer devices 110a, . . . , 110n. In accordance with an embodiment, the application server 122 may be configured to receive an input that corresponds to user-selections on the plurality of consumer devices 110a, . . . , 110n, such as the client device 132, over the network 108. The application server 122 acts as an interface between the scheduler 112 of the media content packaging and distribution system 102 and the plurality of consumer devices 110a, . . . , 110n, such as the client device 132.

The live content storage system 124 may comprise suitable logic, circuitry, and interfaces that may be configured to store live content segments of one or more live feeds of channels, such as a live broadcast feed of a CNN channel. The live content storage system 124 may be communicatively coupled to the CDN 130 to receive the one or more live feeds of channels. The media content storage system 126 may comprise suitable logic, circuitry, and interfaces that may be configured to store media content segments such as VOD content segments. The media content storage system 126 may be communicatively coupled to the CDN 130. The media content storage system 126 may include pre-encoded media assets.

The metadata cloud storage system 128 may comprise suitable logic, circuitry, and interfaces that may be configured to store VOD program metadata 128A, live program metadata 128B, and aggregate viewing information 128C. The VOD program metadata 128A may include metadata associated with media content segments stored in the media content storage system 126. Examples of the VOD program metadata 128A may include a media item identifier, a title of the media item, a short summary of the media content segments, a short summary of ideal ad placements within the content, a file format, digital right management (DRM), encryption information, length of the media item, a date and/or time the media item was added to the catalog of media items, a new item indicator for the media item (e.g., a new media asset that became available within the last 24 hours, last few days, last week, and/or the like), a media item class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the VOD program metadata 128A may also store program-specific information (PSI) data as defined by ISO/IEC 13818-1 (MPEG-2), closed captioning data, and subtitles associated with the media content segments stored in the media content storage system 126. Other forms of metadata may be utilized without departing from the spirit and scope of the various embodiments of the disclosure.

The aggregate viewing information 128C may include audience-based parameters. The audience-based parameters may include calculated values derived by processing of audience data, which corresponds to subscribers of the plurality of consumer devices 110a, . . . , 110n, received from the external data source 120. The audience-based parameters may also include a path to retrieve a media item, for example, a trending media item, from the external data source 120 or other content servers.

The live program metadata 128B may include metadata associated with live content segments of one or more live feeds of channels stored in the live content storage system 124. Examples of the live program metadata 128B may include a media item identifier, a title of the media item, a short summary of the content segments, a file format, encryption information, length of the media item, a date and/or time the media item was added to the catalog of media items, a new item indicator for the media item, a media item class, for example, a television show, a cartoon program, a movie, a news media, an episode, a game, a clip, a recorded sports event, interactive media, and/or the like. In accordance with an exemplary embodiment, the live program metadata 128B may also store program-specific information (PSI) data as defined by ISO/IEC13818-1 (MPEG-2), closed captioning data, subtitles, and one or more inbound triggers, signals, or markers, of the live media feed associated with the live content segments stored in the live content storage system 124. Other forms of metadata may be utilized without departing from the spirit and scope of the various embodiments of the disclosure.

The CDN 130 may correspond to the network 108. The CDN 130 may comprise networks configured for distributing media content. Generally, the term "content," "metadata," "media," and similar words are used interchangeably to refer to any type of media-audio, videos, datacasts, music, text, images, graphics, articles, photos, photo galleries, video galleries, infographics, maps, polls, guest biographies, tweets or other social media, blog posts, and/or the like. The CDN 130 may be configured for providing the plurality of consumer devices 110a, ..., 110n, such as the client device 132, with media content via transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client device 132 may be one of the plurality of consumer devices 110a, ..., 110n. In accordance with an embodiment, the client device 132 may be an ACR-enabled device. The client device 132 may be configured to communicate with the application server 122, via the CDN 130, or a separate communication network.

Figure 2:
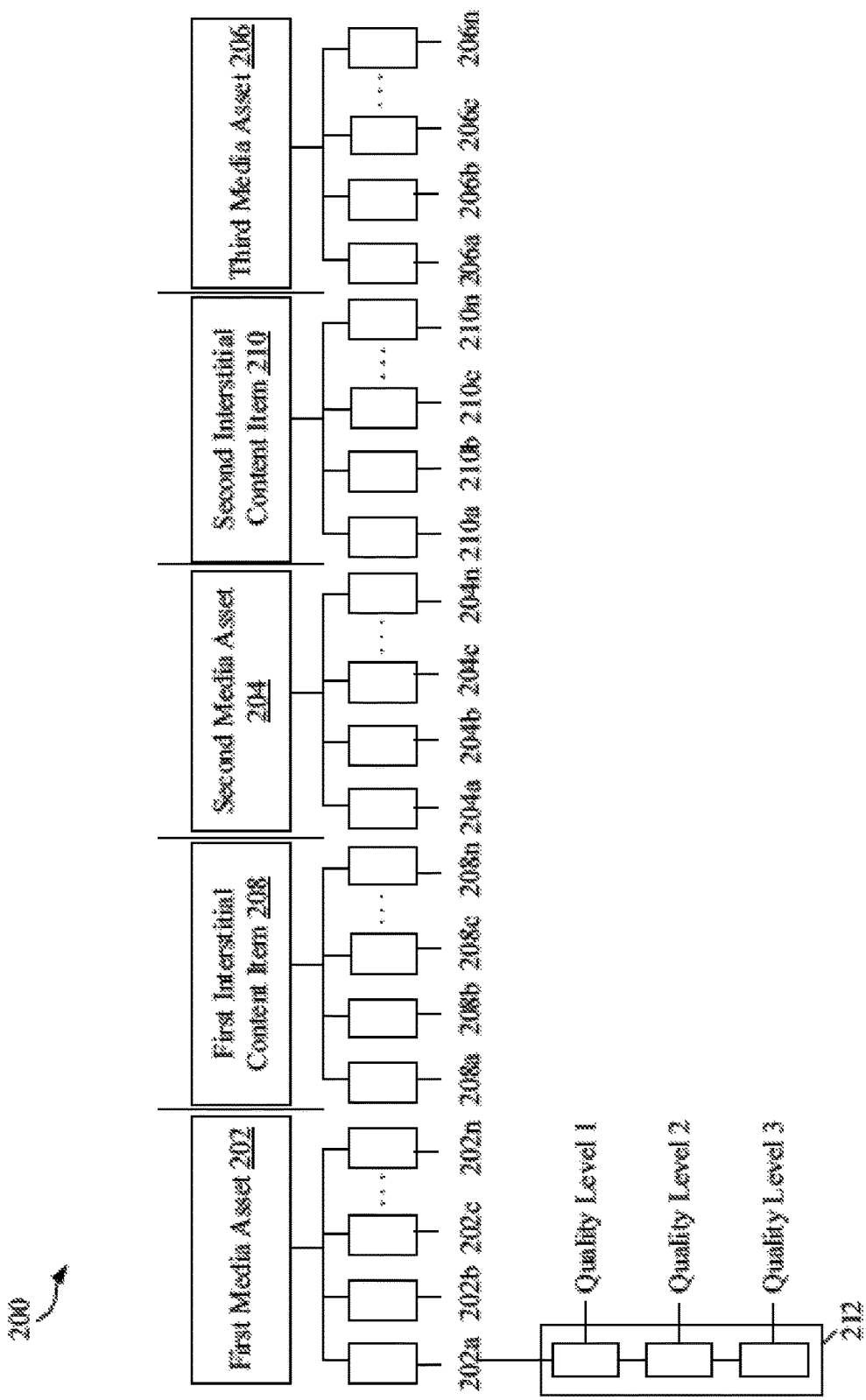
FIG. 2 illustrates segmenting of pre-encoded media content to depict a framework for dynamic scheduling and channel creation by the media content packaging and distribution system of FIG. 1B, in accordance with an exemplary embodiment of the disclosure.

FIG. 2 illustrates an arrangement of pre-encoded media assets in accordance with a programming schedule to depict a framework for dynamic scheduling and channel creation by the media content packaging and distribution system of FIG. 1B, in accordance with an exemplary embodiment of the disclosure. Referring to the exemplary arrangement of FIG. 2, there is shown a first media asset 202, a second media asset 204, a third media asset 206. There is also shown a first interstitial content item 208 placed after the first media asset 202, and a second interstitial content item 210 placed after the second media asset 204. Each media assets 202, 204, and 206 may be a pre-encoded content item, and may be stored in the media content storage system 126 in segments or other forms. For example, the first media asset 202 may be segmented into first set of video segments 202a, 202b, 202c, ..., 202n. Similarly, the second media asset 204 and the third media asset 206 may also be segmented into second set of video segments 204a, 204b, 204c, ..., 204n, and third set of video segments 206a, 206b, 206c, ..., 206n respectively. By way of example, the segmentation may be executed by a segmenting system (not shown) during a preparation stage of the media assets. In accordance with an embodiment, all the segments of the first set of video segments 202a, 202b, 202c, ..., 202n, the second set of video segments 204a, 204b, 204c, ..., 204n, and third set of video segments 206a, 206b, 206c, ..., 206n, may be segmented into consistent length, for example, 10 seconds segments. It may be advantageous to have a consistent and smaller file size of segments to be able to quickly push to the CDN 130, and also for quick downloading by a media player at the end-user side, such as on the plurality of consumer devices 110a, ..., 110n. During the preparation stage of the media assets, an optimum size (or length) of segments may be determined by the segmentation system. Smaller chunks or segments of VOD assets may be difficult to manage as metadata associated with them may increase, whereas larger chunks or segments may be difficult to communicate by the media content packaging and distribution system 102 and also to be downloaded by the media player so as to maintain an adequate buffer for consistent streaming and playback at the media player. Thus, an optimal size of segments may be determined. It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the media assets arranged, as shown, live content segments may be arranged after, in between, or prior to a media asset (e.g. VOD content segments) or an interstitial content item. The insertion of the live content segments may be done on-the-fly based on dynamic scheduling and programming schedule manipulation. The insertion of live content, pre-stored media content, pre-encoded media assets, and/or the like, may be driven by real time or near-real time content context analysis, user-selection on the consumer devices 110a, ..., 110n, or driven by external data received from the external data source 120. The scheduler 112 in association with the PEMCC 114 (also referred to as a stream manipulator) may be configured to insert live content or pre-stored media content, in an existing program stream based on manipulation of a programming schedule of an existing program stream, such as an existing channel.

In accordance with an embodiment, each segment of the first set of video segments 202a, 202b, 202c, ..., 202n, the second set of video segments 204a, 204b, 204c, ..., 204n, and third set of video segments 206a, 206b, 206c, ..., 206n, may be further processed to be stored at various quality levels, and content encryption modes for the purposes of adaptive bitrate streaming and Digital Rights Management, for example, the video segment 202a may be stored in a plurality of quality levels, for example, high definition (HD), high dynamic range (HDR) video, or different quality levels in accordance with specified pixel resolutions, bitrates, frame rates, and/or sample frequencies. As each of the media assets, such as the media assets 202 to 206, are pre-encoded, segmented, and stored in the plurality of quality levels in the media content storage system 126, the media assets may be re-used to create new channels, such as new program streams, without requiring to re-encode a selected media asset when a new program stream is created using the pre-encoded media assets.

For the sake of brevity, and with reference to FIG. 2, there is shown an example of media packaging for adaptive streaming using certain protocols or streaming methods for at least one delivery method of the distribution system. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110a, ..., 110n, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for a same media asset may not be required. Further, based on different operational and technical requirements, media packaging or the arrangement of media assets or other content in a program stream may be different. The media content that is prepared and distributed may include both the programming content, such as long-form presentations, short-form presentations, news or sporting events; and non-programming content, such as paid advertisements, public service advertisements, or promotional material.

Currently, dedicated encoders, such as physical encoders, are used to encode each program stream before distribution or transmission (i.e. before a distribution of a program stream of a channel). Such dedicated encoders are not only costly but also limit ability of a broadcast provider to swap or change content dynamically in a program stream as each content item needs to pass through such dedicated encoders for transmission. In other words, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time. In accordance with the various embodiments of the present disclosure, the media content packaging and distribution system 102 provides an ability to dynamically schedule a media item, such as a pre-encoded media asset, and insert the media item in an existing live media feed of a channel to be directly delivered over a distribution system (such as one or more delivery methods) to be viewed on one or more consumer devices 110a, . . . , 110n. The program stream in which the new media item is inserted may not be required to pass through the dedicated encoders before delivery over the network 108, such as the CDN 130.

Figure 3A:
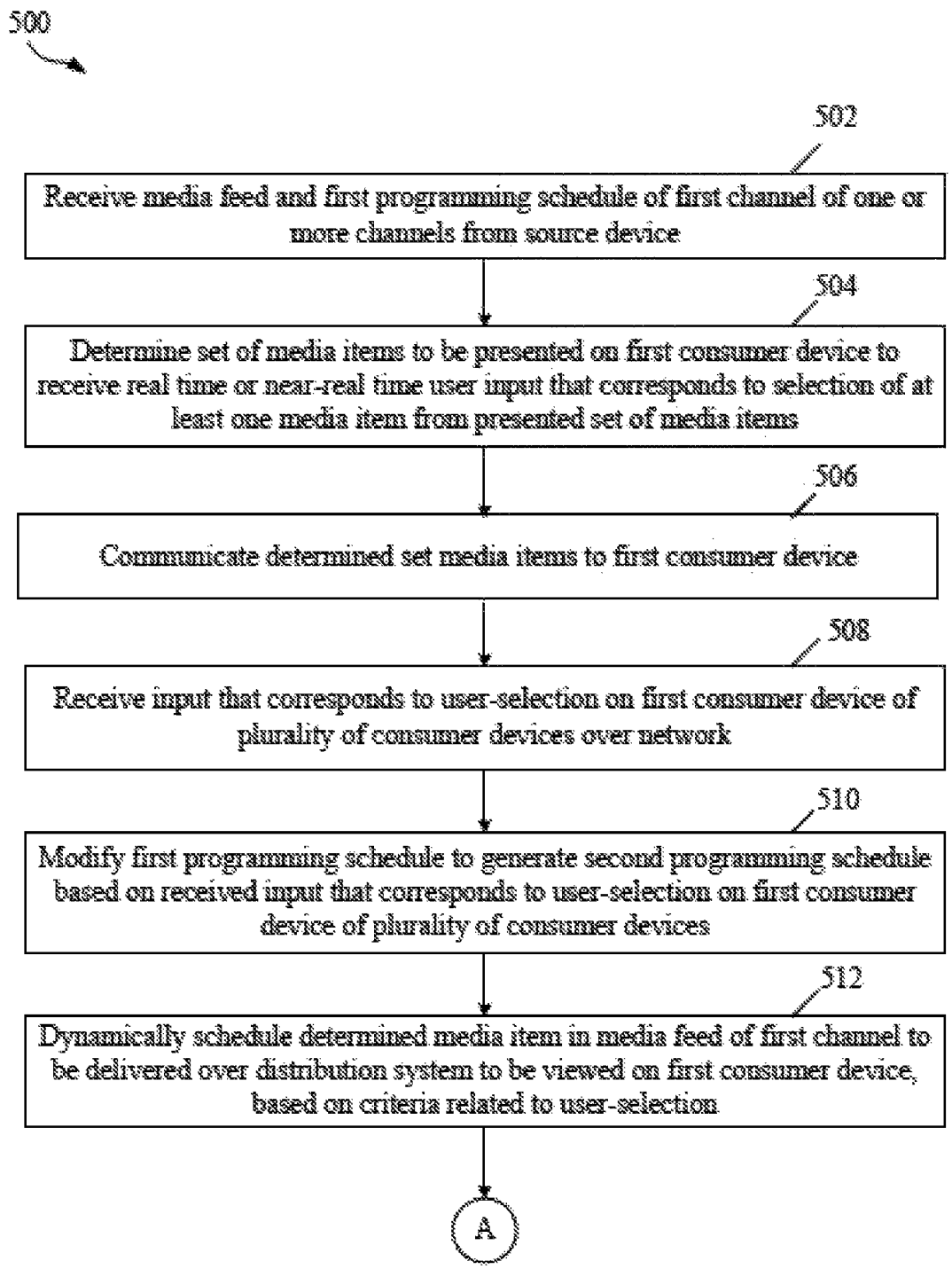
FIGS. 3A and 3B, collectively, depict a flow chart illustrating exemplary operations for dynamic scheduling and channel creation based on a user-selection on a consumer device in the television content packaging and distribution system of FIG. 1B, in accordance with an exemplary embodiment of the disclosure.
Figure 3B:
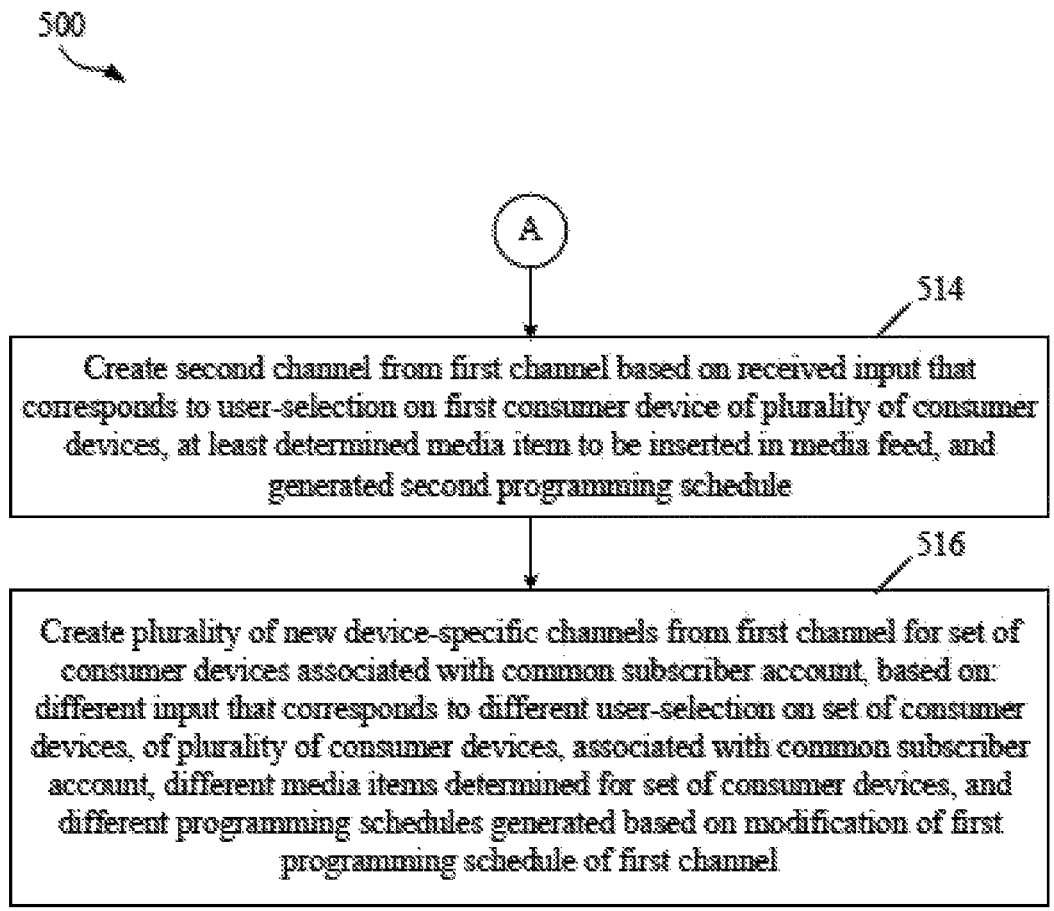

FIGS. 3A and 3B, collectively, depict a flow chart illustrating exemplary operations for dynamic scheduling and channel creation based on a received input that corresponds to a user-selection on a consumer device in the media content packaging and distribution system of FIG. 1B, in accordance with an exemplary embodiment of the disclosure. Referring to FIGS. 3A and 3B, there is shown a flow chart 500 comprising exemplary operations 502 through 516.

At 502, a media feed (or an identifier of the media feed) and a first programming schedule of a first channel of the one or more channels may be received from the source device 118. The scheduler 112 may receive the media feed or the identifier of the media feed, and the first programming schedule of the first channel, such as an existing channel.

At 504, a set of media items to be presented on the first consumer device may be determined. The scheduler 112 may be configured to determine the set of media items to be presented on the first consumer device to receive a real time or a near-real time user input that corresponds to a selection of at least one media item from the presented set of media items. The set of media items may be determined based on demographics data, trending data, content recognition, such as ACR-based data, preference based data, such as set "keywords", historical data, for example, viewing history or past user-selections, associated with the first consumer device.

At 506, the determined set of media items may be communicated to the first consumer device over the network 108. The application server 122 may be configured to communicate the determined set of media items to the first consumer device, such as the client device 132.

At 508, an input that corresponds to a user-selection on the first consumer device of the plurality of consumer devices 110a, . . . 110n, may be received over the network 108. The application server 122 may be configured to receive the input that corresponds to the user-selection on the first consumer device, and further communicate to the scheduler 112. The scheduler 112 may be configured to determine a media item to be inserted in the media feed of the first channel based on criteria related to the user-selection. The criteria related to the user-selection comprise a first criterion that corresponds to a real time or a near-real time user input corresponding to the user-selection on the first consumer device. The criteria related to the user-selection further comprise a second criterion that corresponds to a filtering operation based on user-defined metadata or keyword, and a third criterion that corresponds to historical analysis of viewing habits of a user, such as the user 134, associated with the first consumer device.

At 510, the first programming schedule may be modified to generate a second programming schedule based on the received input that corresponds to the user-selection on the first consumer device of the plurality of consumer devices 110a, . . . 110n. The scheduler 112 may be configured to modify the first programming schedule based on the received input that corresponds to the user-selection on the first consumer device to generate the second programming schedule. For example, a reference that points to the determined media item related to the user-selection may be included in the first programming schedule to schedule the media item. In accordance with an embodiment, the scheduler 112 may be configured to alter or extend programming for the first channel on-the-fly based on different input received from the first consumer device in real time or near-real time, and the different programming schedules generated based on the modification of the first programming schedule of the first channel.

At 512, the determined media item may be dynamically scheduled in the media feed of the first channel to be delivered over a distribution system (such as the network 108, the CDN 130, and/or the like) to be viewed on the first consumer device, based on the criteria related to the user-selection. The media feed of the first channel is modified to include the selected media item to be delivered over the distribution system to be viewed on the first consumer device. The scheduler 112 may be configured to dynamically schedule the determined media item.

At 514, a second channel may be created from the first channel based on the received input that corresponds to the user-selection on the first consumer device of the plurality of consumer devices, the determined media item to be inserted in the media feed, and the generated second programming schedule. The PEMCC 114 may be configured to stitch the determined media item based on the modified first programming schedule such that the second channel is created to be directly delivered over the distribution system.

At 516, a plurality of new device-specific channels may be created from the first channel for a set of consumer devices. The set of consumer devices may be associated with a common subscriber account. The plurality of new device-specific channels may be created based on different input that corresponds to different user-selection on the set of consumer devices associated with the common subscriber account, different media items determined for the set of consumer devices, and the different programming schedules generated based on the modification of the first programming schedule of the first channel. For example, a user of a first consumer device, such as a TV, may provide a different selection on the TV, and another user of another consumer device, such as a smartphone, may provide a different user-selection for the common subscriber account for both the TV and the smartphone to access the first channel. In such a case, device-specific program streams may be delivered based on the differential user-selections although both the devices, such as the TV and the smartphone, are subscribers of the common subscriber account. In accordance with an embodiment, the scheduler 112 in conjunction with the PEMCC 114 may be configured to create a plurality of new channels from the first channel based on a plurality of user-selections received from the plurality of consumer devices 110a, . . . 110n, over the network 108, a plurality of media items determined for the plurality of consumer devices 110a, . . . 110n, and a plurality of programming schedules generated for the plurality of consumer devices 110a, . . . 110n, based on the modification of the first programming schedule of the first channel.

Figure 4A:
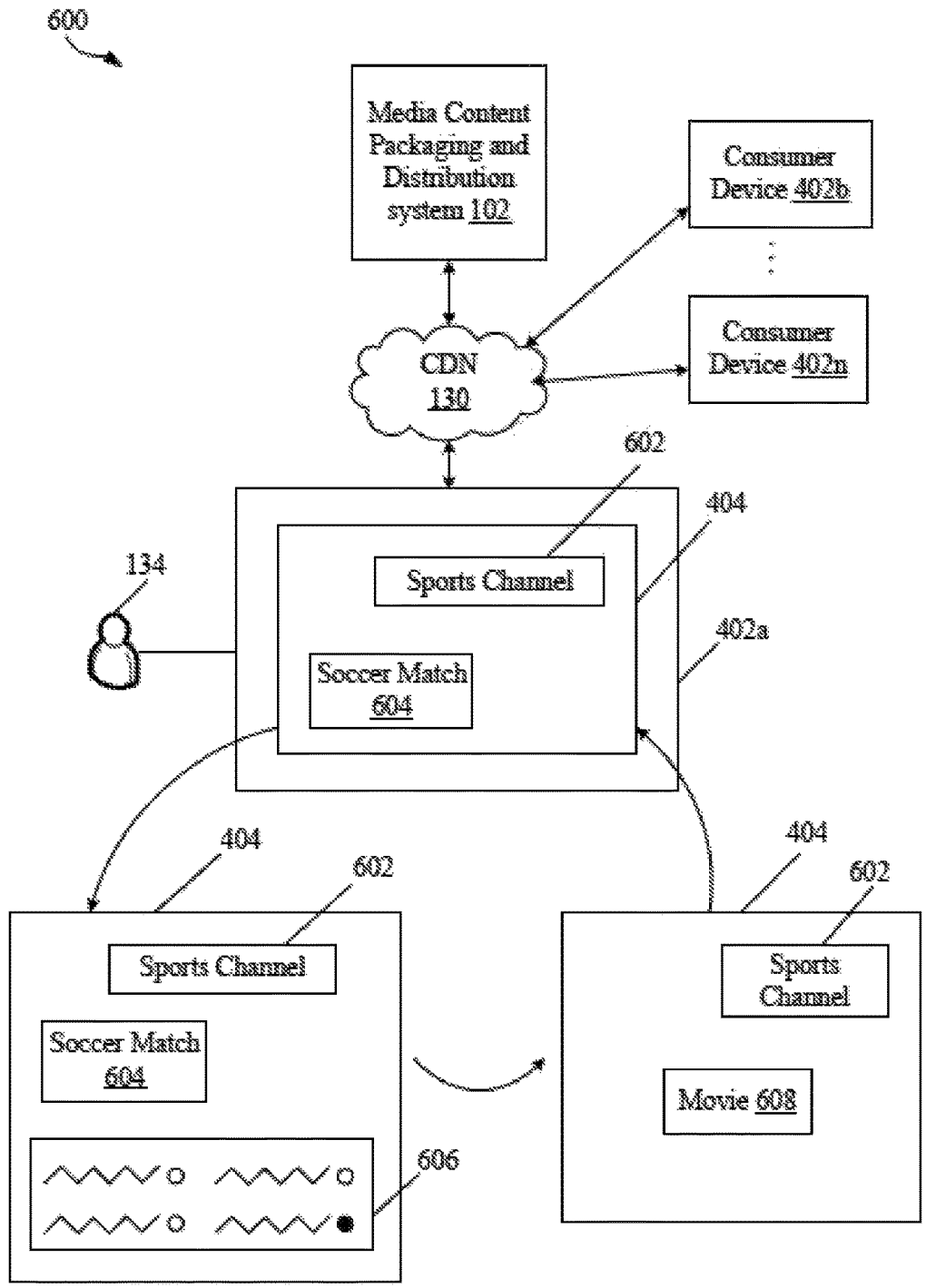
FIG. 4A illustrates an exemplary scenario for user-selection-driven dynamic scheduling and channel creation, in accordance with an exemplary embodiment of the disclosure.

FIG. 4A illustrates an exemplary scenario for user-selection-driven dynamic scheduling and channel creation, in accordance with an exemplary embodiment of the disclosure. Referring to FIG. 4A, there is shown an exemplary illustrative scenario 600 that includes the first consumer device 402a, the plurality of other consumer devices 402b, . . . , 402n, the CDN 130, and the media content packaging and distribution system 102. There is also shown a sports channel 602 in which a live stream of a sports event, such as a soccer match 604, is displayed on the display screen 404 of the first consumer device 402a. The user 134 may be associated with the first consumer device 402 (which may be the client device 132).

In accordance with the exemplary illustrative scenario 600, the sports channel 602 may correspond to a live program stream of an existing channel that is distributed to the first consumer device 402a and the plurality of other consumer devices 402b, . . . , 402n. The first consumer device 402 and the plurality of other consumer devices 402b, . . . , 402n corresponds to the plurality of other consumer devices 110a, . . . , 110n. The scheduler 112 may be configured to determine a set of media items to be presented on the first consumer device 402a. The scheduler 112 may then communicate metadata information associated with the determined set of media items to the application server 122. The application server 122 may be configured to further communicate the metadata information associated with the determined set of media items to be presented on the first consumer device 402a. The user 134 may select one of the options 606 from the displayed set of media items as per choice. The application server 122 may be configured to receive an input that corresponds to the user-selection on the first consumer device 402a. The application server 122 may then communicate the received user-selection from the first consumer device 402 on which the sports channel 602 is currently viewed, to the scheduler 112. The scheduler 112 may be configured to determine a media item to be inserted in the live program stream (such as a live media feed) of the sports channel 602 based on the real time or near-real time input of the user-selection. The scheduler 112 may be configured to modify the programming schedule of the sports channel 602 in real time or near-real time to schedule the determined media item that corresponds to the user-selected media item, such as a movie 608.

The PEMCC 114 may be configured to stitch in real time or near-real time (a dynamic stitching) the determined media item referenced in the modified programming schedule of the sports channel 602. The live program stream of the sports channel 602 now includes the inserted video segments of the movie 608, which is communicated via the CDN 130 to be viewed on the first consumer device 402a. The first consumer device 402 may be configured to display the movie 608 based on the provided input related to the user-selection on the sports channel 602 interrupting the soccer match 604 played on the sports channel 602, as shown. After the movie 608 is played, the soccer match 604 may be resumed. Alternatively, based on another input to switch to the soccer match 604, the scheduler 112 may be re-configured to allow the PEMCC 114 to resume stitching video segments of the live program stream of the soccer match 604 to be delivered over the network 108, such as the CDN 130, to be viewed on the first consumer device 402a. The broadcast feed, such as the live program stream of the soccer match 604 may be unaffected for the other consumer devices 402b, . . . , 402n.

Figure 4B:
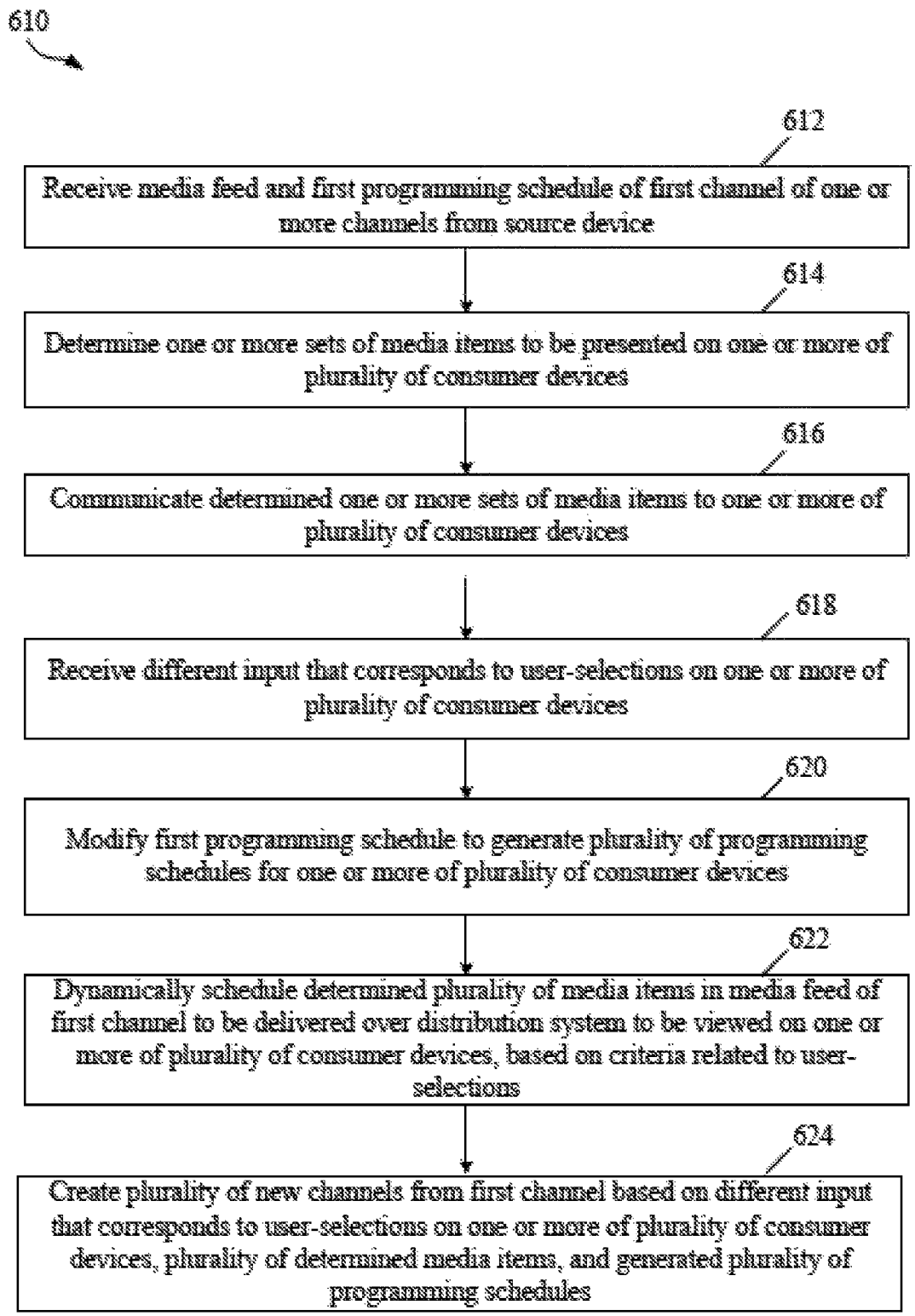
FIG. 4B is a flow chart illustrating exemplary operations for dynamic scheduling and channel creation based on received input that corresponds to multiple user-selections on a plurality of consumer devices, in accordance with an exemplary embodiment of the disclosure.

FIG. 4B is a flow chart illustrating exemplary operations for dynamic scheduling and channel creation based on received input that corresponds to multiple user-selections on a plurality of consumer devices, in accordance with an exemplary embodiment of the disclosure. Referring to FIG. 4B, there is shown a flow chart 610 comprising exemplary operations 612 through 624.

At 612, a media feed (or an identifier of the media feed) and a first programming schedule of a first channel of the one or more channels may be received from the source device 118. The scheduler 112 may receive the media feed or the identifier of the media feed, and the first programming schedule of the first channel, such as an existing channel.

At 614, one or more sets of media items to be presented on one or more of the plurality of consumer devices 110a, . . . 110n, may be determined. The scheduler 112 may be configured to determine the one or more sets of media items to be presented on one or more of the plurality of consumer devices 110a, . . . 110n to receive user input that corresponds to a selection of at least one media item from the presented set of media items from the one or more of the plurality of consumer devices 110a, . . . 110n. The set of media items may be determined based on demographics data, trending data, content recognition, such as ACR-based data, preference based data, such as set "keywords", historical data, for example, viewing history or past user-selections, associated with one or more of the plurality of consumer devices 110a, . . . 110n.

At 616, the determined one or more sets of media items may be communicated to the one or more of the plurality of consumer devices 110a, . . . 110n, over a distribution system (e.g. the CDN 130). The application server 122 may be configured to communicate the determined one or more sets of media items to the one or more of the plurality of consumer devices 110a, . . . 110n.

At 618, different input that corresponds to various user-selections on one or more of the plurality of consumer devices 110a, . . . 110n, may be received over the network 108. The application server 122 may be configured to receive the different input that corresponds to the user-selections, and further communicate to the scheduler 112. The scheduler 112 may be configured to determine a plurality of media items to be inserted in the media feed of the first channel based on criteria related to the user-selections. The criteria related to the user-selections comprise a first criterion that corresponds to a real time or a near-real time user input corresponding to the user-selections on one or more of the plurality of consumer devices 110a, . . . 110n. The criteria related to the user-selections further comprise a second criterion that corresponds to a filtering operation based on user-defined metadata or keyword set by different users of the one or more of the plurality of consumer devices 110a, . . . 110n. All of the one or more of the plurality of consumer devices 110a, . . . 110n may not be associated with a common subscriber account. The criteria related to the user-selections further comprise a third criterion that corresponds to historical analysis of viewing habits of the users associated with one or more of the plurality of consumer devices 110a, . . . 110n.

At 620, the first programming schedule may be modified to generate a plurality of programming schedules for one or more of the plurality of consumer devices 110a, . . . 110n. The scheduler 112 may be configured to modify the first programming schedule based on the received different input that corresponds to the user-selections on the one or more of the plurality of consumer devices 110a, . . . 110n. For example, different references that points to the determined plurality of media item related to the user-selections may be included in the first programming schedule to schedule the plurality of media items for one or more of the plurality of consumer devices 110a, . . . 110n. In accordance with an embodiment, the scheduler 112 may be configured to alter or extend programming for the first channel on-the-fly based on different input received from different consumer devices in real time or near-real time, and the different programming schedules generated based on the modification of the first programming schedule of the first channel.

At 622, the determined plurality of media items may be dynamically scheduled in the media feed of the first channel to be delivered over a distribution system (such as the network 108, the CDN 130, and/or the like) to be viewed on one or more of the plurality of consumer devices 110a, . . . 110n, based on the criteria related to various user-selections. The media feed of the first channel is modified to include the selected media items to be delivered over the distribution system to be viewed on the one or more of the plurality of consumer devices 110a, . . . 110n. The scheduler 112 may be configured to dynamically schedule the determined plurality of media items.

At 624, a plurality of new channels may be created from the first channel based on the different input that corresponds to the user-selections on the one or more of the plurality of consumer devices 110a, . . . 110n, the plurality of determined media items, and the generated plurality of programming schedules. The PEMCC 114 may be configured to stitch the determined plurality of media item based on the generated plurality of programming schedules such that plurality of new channels are created to be directly delivered over the distribution system. The PEMCC 114 may be configured to stitch the determined plurality of media item based on the generated plurality of programming schedules to generate multiple new program streams for distribution to the one or more of the plurality of consumer devices 110a, . . . , 110n.

Figure 5:
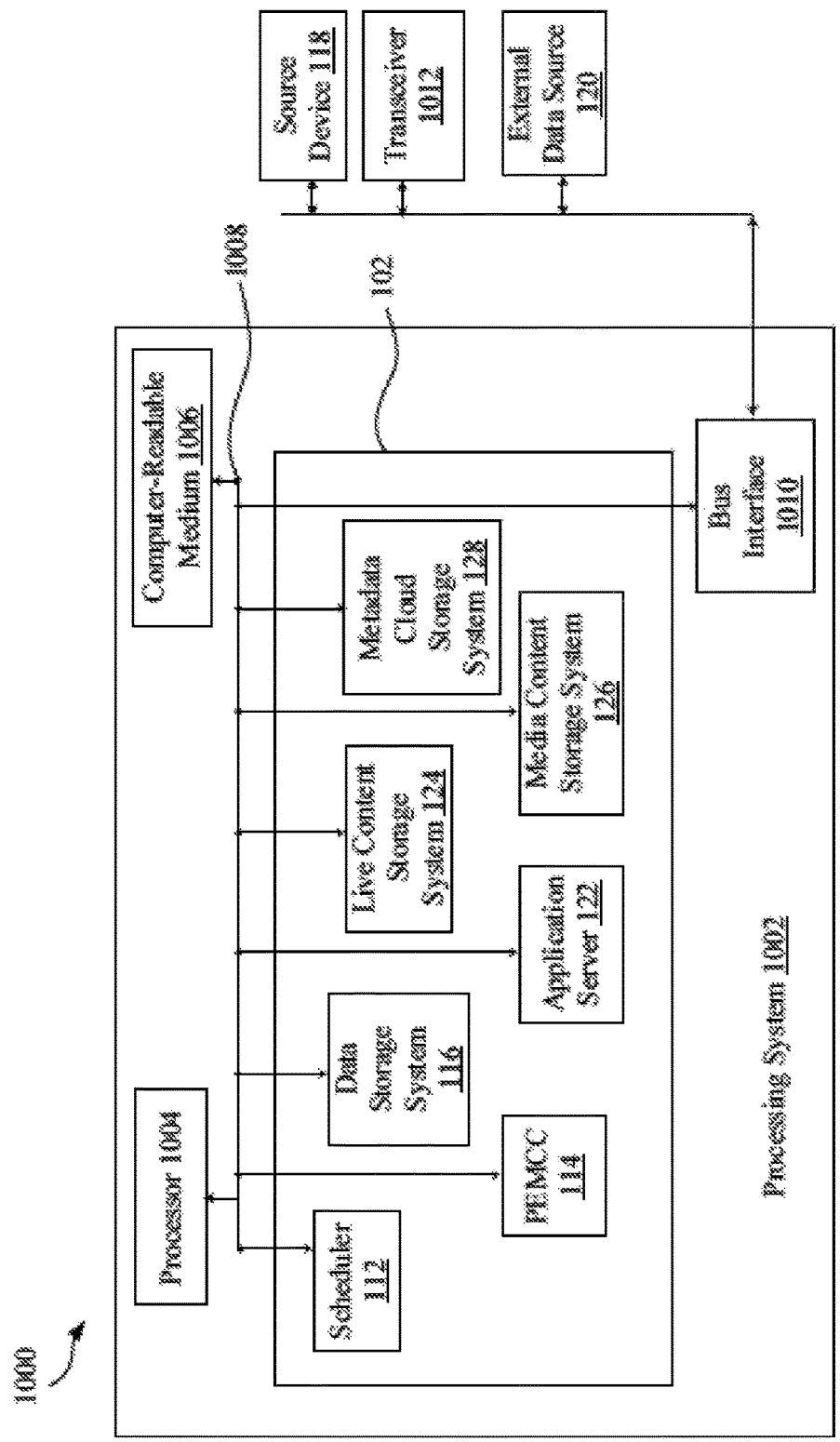
FIG. 5 is a conceptual diagram illustrating an example of a hardware implementation for a television content packaging and distribution system employing a processing system for dynamic scheduling and channel creation based on user selection, in accordance with an exemplary embodiment of the disclosure.

FIG. 5 is a conceptual diagram illustrating an example of a hardware implementation for a media content packaging and distribution system employing a processing system for dynamic scheduling and channel creation based on user selection, in accordance with an exemplary embodiment of the disclosure. Referring to FIG. 5, the hardware implementation shown by a representation 1000 for the media content packaging and distribution system 102 employs a processing system 1002 for dynamic scheduling and channel creation, in accordance with an exemplary embodiment of the disclosure, as described herein. In some examples, the processing system 1002 may comprise one or more hardware processors 1004, a non-transitory computer-readable medium 1006, the scheduler 112, a hardware PEMCC 114, the data storage system 116, the application server 122, a hardware live content storage system 124, a hardware media content storage system 126, and a hardware metadata cloud storage system 128. In accordance with an embodiment, the data storage system 116 may include the hardware live content storage system 124, the hardware media content storage system 126, and the hardware metadata cloud storage system 128. It should be recognized that, in some embodiment of the disclosure, one or more components of FIG. 5 may include software whose corresponding code may be executed by a at least one processor, for across multiple processing environments. For example, the scheduler 112, the data storage system 116, the application server 122 may include software that may be executed across a single or multiple processing environments.

In this example, the media content packaging and distribution system 102 employing the processing system 1002 may be implemented with bus architecture, represented generally by bus 1008. The bus 1008 may include any number of interconnecting buses and bridges depending on the specific implementation of the media content packaging and distribution system 102 and the overall design constraints. The bus 1008 links together various circuits including the one or more processors, represented generally by the processor 1004, the non-transitory computer-readable media, represented generally by the computer-readable medium 1006, the scheduler 112, the hardware PEMCC 114, the data storage system 116, the application server 122, the hardware live content storage system 124, the hardware media content storage system 126, and the hardware metadata cloud storage system 128 which may be configured to carry out one or more operations or methods described herein. A bus interface 1010 provides an interface between the bus 1008 and a transceiver 1012. The transceiver 1012 provides communicating via the network 108 with various other apparatus, such as the AOGADS 106a, . . . , 106n, the consumer devices 110a, . . . , 110n, such as the client device 132 or the first consumer device 402a, the external data source 120, and the source device 118.

The processor 1004 may be configured to manage the bus 1008 and general processing, including the execution of a set of instructions stored on the computer-readable medium 1006. The set of instructions, when executed by the processor 1004, causes the media content packaging and distribution system 102 to execute the various functions described herein for any particular apparatus. The computer-readable medium 1006 may also be used for storing data that is manipulated by the processor 1004 when executing the set of instructions. The computer-readable medium 1006 may also be configured to store data for one or more of the scheduler 112, the hardware PEMCC 114, the data storage system 116, the application server 122, the hardware live content storage system 124, the hardware media content storage system 126, and/or the hardware metadata cloud storage system 128.

In an aspect of the disclosure, the processor 1004, the computer-readable medium 1006, or a combination of both may be configured or otherwise specially programmed to execute the operations or functionality of the scheduler 112, the hardware PEMCC 114, the data storage system 116, the application server 122, the hardware live content storage system 124, the hardware media content storage system 126, and/or the hardware metadata cloud storage system 128, or various other components described herein. For example, processor 1004, computer-readable medium 1006, or a combination of both may be configured or otherwise specially programmed to perform the operations and functionality of the scheduler 112, the hardware PEMCC 114, the data storage system 116, the application server 122, the hardware live content storage system 124, the hardware media content storage system 126, and/or the hardware metadata cloud storage system 128 as described with respect to FIGS. 1A, 1B, 2, 3A, 3B, 4A, 4B, and 5.

Various embodiments of the disclosure comprise a media content packaging and distribution system 102 that may be configured to handle distribution of one or more channels to be viewed on one or more of a plurality of consumer devices (such as the consumer devices 110a, . . . , 110n). The media content packaging and distribution system 102 may comprise, for example, the scheduler 112, the PEMCC 114, and the data storage system 116. The media content packaging and distribution system 102 may further comprise, for example, the application server 122, the live content storage system 124, the media content storage system 126, the metadata cloud storage system 128. The metadata cloud storage system 128 may further include the VOD program metadata 128A, the live program metadata 128B, and the aggregate viewing information 128C. The scheduler 112 may be configured to receive a media feed and a first programming schedule of a first channel of the one or more channels from the source device 118. The application server 122 may be configured to receive an input that corresponds to a user-selection on a first consumer device of the plurality of consumer devices 110a, . . . , 110n over a network 108. The scheduler 112 may be configured to determine a media item to be inserted in the media feed of the first channel based on criteria related to the user-selection. The scheduler 112 may be configured to dynamically schedule the determined media item in the media feed of the first channel to be delivered over the network 108 to be viewed on the first consumer device, based on the criteria related to the user-selection.

Various embodiments of the disclosure may provide a non-transitory computer-readable medium having stored thereon, computer implemented instruction that when executed by a processor causes a media content packaging and distribution system to execute operations to handle distribution of one or more channels to be viewed on one or more of a plurality of consumer devices (such as the consumer devices 110a, . . . , 110n). The media content packaging and distribution system 102 may execute operations comprising receiving a media feed and a first programming schedule of a first channel of the one or more channels from the source device 118. An input that corresponds to a user-selection on a first consumer device of the plurality of consumer devices may be received over a network, such as the network 108. A media item to be inserted in the media feed of the first channel may be determined based on criteria related to the user-selection. The determined media item may be dynamically scheduled in the media feed of the first channel to be delivered over the network 108 to be viewed on the first consumer device, based on the criteria related to the user-selection.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for the dynamic scheduling and channel creation based on user selection.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual sever or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   one or more processors in a media content packaging and distribution system that is configured to manage distribution of one or more channels that are viewed on one or more of a plurality of consumer devices, the one or more processors are configured to:
   receive, a media feed of a first channel of the one or more channels and a first programming schedule of the first channel of the one or more channels, from a source device;
   receive an input that corresponds to a user-selection on a first consumer device of the plurality of consumer devices;
   determine a media item to be inserted in the media feed of the first channel based on criteria related to the user-selection,
   wherein one of the criteria corresponds to historical analysis of viewing habits of a user associated with the first consumer device; and
   dynamically schedule the determined media item in the media feed of the first channel to be delivered over a distribution system to be viewed on the first consumer device, based on the criteria related to the user-selection.

2. The system according to claim 1, wherein the criteria related to the user-selection comprises a first criterion that corresponds to a real time or a near-real time user input corresponding to the user-selection on the first consumer device.

3. The system according to claim 2, wherein the one or more processors are further configured to:
   determine a set of media items that is presented on the first consumer device;
   receive the real time or a near-real time user input that corresponds to a selection of at least one media item from the presented set of media items; and
   modify the media feed of the first channel, to include the selected media item to be delivered over the distribution system, which is viewed on the first consumer device.

4. The system according to claim 2, wherein the criteria related to the user-selection further comprises a second criterion that corresponds to a filtering operation based on user-defined metadata.

5. The system according to claim 1, wherein the one or more processors are further configured to:
   modify the first programming schedule based on the received input that corresponds to the user-selection on the first consumer device of the plurality of consumer devices; and
   generate a second programming schedule based on the modified first programming schedule.

6. The system according to claim 5, wherein the one or more processors are further configured to create a second channel from the first channel based on at least one of the received input that corresponds to the user-selection on the first consumer device of the plurality of consumer devices, at least the determined media item, or the generated second programming schedule.

7. The system according to claim 1, wherein the one or more processors are further configured to create, a plurality of new device-specific channels from the first channel for a first plurality of consumer devices of the plurality of consumer devices that are associated with a common subscriber account, based on at least one of a different input that corresponds to different user-selection on each of the first plurality of consumer devices, different media items determined for the first plurality of consumer devices, or different programming schedules generated for the first plurality of consumer devices,
   wherein the different programming schedules are generated based on the modification of the first programming schedule of the first channel.

8. The system according to claim 1, wherein the one or more processors are further configured to create a plurality of new channels from the first channel based on at least one of a plurality of user-selections received from the plurality of consumer devices over the distribution system, a plurality of media items determined for the plurality of consumer devices, or a plurality of programming schedules generated for the plurality of consumer devices,
   wherein the plurality of programming schedules are generated based on the modification of the first programming schedule of the first channel.

9. A method, comprising:
   in a media content packaging and distribution system that manages distribution of one or more channels that are viewed on one or more of a plurality of consumer devices:

receiving a media feed of a first channel of the one or more channels and a first programming schedule of the first channel of the one or more channels, from a source device;

receiving an input that corresponds to a user-selection on a first consumer device of the plurality of consumer devices;

determining a media item to be inserted in the media feed of the first channel based on criteria related to the user-selection, wherein one of the criteria corresponds to historical analysis of viewing habits of a user associated with the first consumer device; and dynamically scheduling the determined media item in the media feed of the first channel to be delivered over a distribution system to be viewed on the first consumer device, based on the criteria related to the user-selection.

10. The method according to claim 9, wherein the criteria related to the user-selection comprises a first criterion that corresponds to a real time or a near-real time user input corresponding to the user-selection on the first consumer device.

11. The method according to claim 10, further comprising:

determining a set of media items that is presented on the first consumer device;

receiving the real time or a near-real time user input that corresponds to a selection of at least one media item from the presented set of media items and modifying the media feed of the first channel, to include the selected media item to be delivered over the distribution system, which is viewed on the first consumer device.

12. The method according to claim 10, wherein the criteria related to the user-selection further comprises a second criterion that corresponds to a filtering operation based on user-defined metadata.

13. The method according to claim 9, further comprising:

modifying the first programming schedule based on the received input that corresponds to the user-selection on the first consumer device of the plurality of consumer devices; and generating a second programming schedule based on the modified first programming schedule.

14. The method according to claim 13, further comprising creating a second channel from the first channel based on at least one of the received input that corresponds to the user-selection on the first consumer device of the plurality of consumer devices, at least the determined media item, or the generated second programming schedule.

15. The method according to claim 9, further comprising creating, a plurality of new device-specific channels from the first channel for a first plurality of consumer devices of the plurality of consumer devices that are associated with a common subscriber account, based on at least one of a different input that corresponds to different user-selection on each of the first plurality of consumer devices, different media items determined for the first plurality of consumer devices, or different programming schedules generated for the first plurality of consumer devices, wherein the different programming schedules are generated based on the modification of the first programming schedule of the first channel.

16. The method according to claim 9, further comprising creating a plurality of new channels from the first channel based on at least one of a plurality of user-selections received from the plurality of consumer devices over the distribution system, a plurality of media items determined for the plurality of consumer devices, or a plurality of programming schedules generated for the plurality of consumer devices, wherein the plurality of programming schedules are generated based on the modification of the first programming schedule of the first channel.

17. A non-transitory computer-readable medium having stored thereon, computer implemented instruction that when executed by a processor in a computer, causes the computer to execute operations, the comprising:

in a media content packaging and distribution system that manages distribution of one or more channels to be viewed on one or more of a plurality of consumer devices:

receiving a media feed of a first channel of the one or more channels and a first programming schedule of the first channel of the one or more channels, from a source device;

receiving an input that corresponds to a user-selection on a first consumer device of the plurality of consumer devices;

determining a media item to be inserted in the media feed of the first channel based on criteria related to the user-selection, wherein one of the criteria corresponds to historical analysis of viewing habits of a user associated with the first consumer device; and dynamically scheduling the determined media item in the media feed of the first channel to be delivered over a distribution system to be viewed on the first consumer device, based on the criteria related to the user-selection.

18. The non-transitory computer-readable according to claim 17, wherein the criteria related to the user-selection comprises a first criterion that corresponds to a real time or a near-real time user input corresponding to the user-selection on the first consumer device.

* * * * *